United States Patent
Chou et al.

(10) Patent No.: US 9,074,710 B2
(45) Date of Patent: Jul. 7, 2015

(54) PIPE UNIT

(75) Inventors: Chih-Neng Chou, Hsin-chu (TW); Kuo-Pang Tseng, Hsin-chu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 13/548,673

(22) Filed: Jul. 13, 2012

(65) Prior Publication Data

US 2012/0279604 A1  Nov. 8, 2012

Related U.S. Application Data

(62) Division of application No. 12/778,347, filed on May 12, 2010, now abandoned, which is a division of application No. 11/376,329, filed on Mar. 16, 2006, now Pat. No. 7,735,208.

(51) Int. Cl.
  *F16L 25/12* (2006.01)
  *F16L 51/02* (2006.01)

(52) U.S. Cl.
  CPC ............ *F16L 25/12* (2013.01); *Y10T 29/49895* (2015.01); *Y10T 29/49904* (2015.01); *Y10T 29/49881* (2015.01); *Y10T 29/49877* (2015.01); *F16L 51/027* (2013.01)

(58) Field of Classification Search
  CPC .................................. F16L 25/12; F16L 51/027
  USPC ...................... 285/9.2, 32, 912, 226
  See application file for complete search history.

(56) References Cited

U.S. PATENT DOCUMENTS

| | | | |
|---|---|---|---|
| 1,726,483 A | 8/1929 | Giesler | |
| 1,786,506 A | 12/1930 | Ray | |
| 2,565,296 A | 8/1951 | Chyle | |
| 2,818,636 A | 1/1958 | Fentress et al. | |
| 2,931,048 A | 4/1960 | Chiappetta et al. | |
| 2,958,550 A | 11/1960 | Mcdonald | |
| 3,096,104 A | 7/1963 | Browning | |
| 3,290,063 A * | 12/1966 | Haeber | 285/18 |
| 3,426,417 A * | 2/1969 | Austin | 29/237 |
| 3,455,013 A | 7/1969 | Rayburn | |
| 3,606,400 A | 9/1971 | Hines | |
| 3,653,115 A * | 4/1972 | Perkins | 29/237 |
| 4,106,798 A | 8/1978 | Haug | |
| 5,528,208 A | 6/1996 | Kobayashi | |
| 5,926,943 A | 7/1999 | Kashy | |
| 6,539,599 B2 | 4/2003 | Martin et al. | |
| 6,631,928 B1 | 10/2003 | Sakata | |
| 6,729,007 B2 * | 5/2004 | Weisberger et al. | 29/434 |
| 6,775,890 B2 * | 8/2004 | Kolarik | 29/235 |
| 7,284,771 B2 | 10/2007 | Baumann et al. | |
| 7,735,208 B2 | 6/2010 | Chou et al. | |
| 2009/0103973 A1 | 4/2009 | Rohwedder | |

FOREIGN PATENT DOCUMENTS

| | | |
|---|---|---|
| CN | 2419457 Y | 2/2001 |
| DE | 19514095 A1 | 10/1996 |
| DE | 19856513 C1 | 5/2000 |
| JP | 08-004960 A | 1/1996 |
| JP | 2004-108470 A | 4/2004 |

* cited by examiner

*Primary Examiner* — James Hewitt
(74) *Attorney, Agent, or Firm* — Rabin & Berdo, P.C.

(57) ABSTRACT

A pipe unit includes a pipe body, first and second flanges, and an adjusting structure. The first flange and the second flange are respectively disposed on opposite first and second ends of the pipe body. The adjusted structure is disposed between the first and second flanges and serves to adjust the length of the pipe unit.

3 Claims, 4 Drawing Sheets

PIPE UNIT

This is a Divisional of U.S. application Ser. No. 12/778,347, filed May 12, 2010 now abandoned, which is a Divisional of U.S. application Ser. No. 11/376,329, filed Mar. 16, 2006, now U.S. Pat. No. 7,735,208.

BACKGROUND OF THE INVENTION

1. Field of the Invention

The invention relates in general to a pipe unit and a method of assembling a pipe conduit using the same. More particularly, the invention is directed to a pipe unit whose length is adjusted by an adjusting structure and a method of assembling the pipe conduit using the adjusting structure.

2. Description of the Related Art

In a semi-conductor factory, periodic service and maintenance is essential to maintain the efficiency of operation and the lifespan of the production facility. During the service and maintenance of the production facility, part of the elements of the production facility is removed, so that unnecessary substances are removed and malfunctioned elements are replaced. After the service and maintenance are done, the elements are assembled again. When assembling the elements, the assembly tolerance, the characteristics and positioning of elements need to be taken into consideration to assure that best efficiency is achieved after the assembly is done.

Take the pipe conduit of semi-conductor production facility used in the transport of plasma for example. The pipe conduit normally consists of several pipe units. Considering the working environment and terms for assembly, the pipe unit is normally a bellow. During the periodic service and maintenance of pipe conduit, only necessary part of the pipe unit is disassembled for service and maintenance. After the service and maintenance are done, the disassembled pipe units are assembled with the pipe conduit again. Due to the characteristics of high temperature and high pressure of plasma transport, the material of the pipe unit must be high-temperature and high-pressure resistant and strong enough such as stainless steel. The pipe unit has considerable thickness and weight, and it is not easy for the operating personnel to apply forces from the two ends of the pipe unit to compress the pipe unit so that the pipe unit is precisely positioned in the pipe conduit. Furthermore, the leakproof element of the pipe conduit such as an O-shaped ring may be worn out during the process of assembling the pipe unit, causing leakage to the pipe conduit.

SUMMARY OF THE INVENTION

It is therefore an object of the invention to provide a pipe unit and a method for assembling a pipe conduit using the same. By using an adjusting structure to adjust the length of the pipe unit, the assembly of the pipe unit is simplified, the positioning of the pipe unit is made easy, and other elements of the pipe conduit are less likely to be damaged.

The invention achieves the above-identified object by providing a pipe unit. The pipe unit comprises a pipe body, a first pipe flange, a second pipe flange, and an adjusting structure. The pipe body has a first end and a second end. The first pipe flange and the second pipe flange are disposed on the first end and the second end, respectively. The adjusting structure is disposed between the first pipe flange and the second pipe flange and is for adjusting the length of the pipe unit.

The invention achieves another object by providing a method for assembling a pipe conduit. Firstly, a first pipe unit, a second pipe unit and a third pipe unit are provided. The first pipe unit comprises a pipe body, a first pipe flange, a second pipe flange, and an adjusting structure. The pipe body has a first end and a second end. The first pipe flange and the second pipe flange are disposed on the first end and the second end, respectively. The adjusting structure is disposed between the first pipe flange and the second pipe flange. The second pipe unit has a third pipe flange. The third pipe unit has a fourth pipe flange. The fourth pipe flange and the third pipe flange are separated at a pipe unit assembly distance. Then, the adjusting structure is adjusted for enabling the length of the first pipe unit to be smaller than the pipe unit assembly distance. Next, the first pipe unit is disposed between the second pipe unit and the third pipe unit for enabling the first pipe flange and the second pipe flange to be corresponding to the third pipe flange and the fourth pipe flange, respectively. Then, the adjusting structure is adjusted for enabling the first pipe flange and the second pipe flange to be coupled with the third pipe flange and the fourth pipe flange, respectively.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
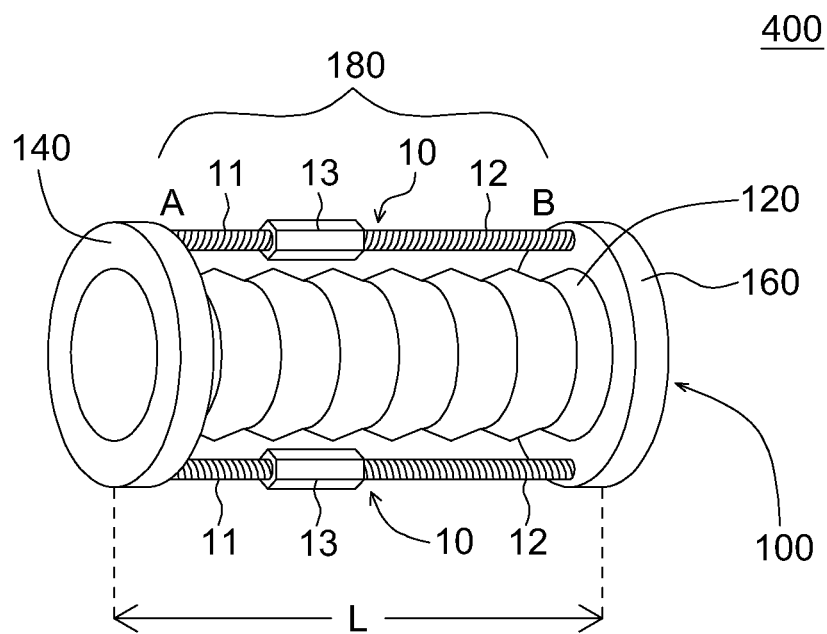
FIG. 1 is an exploded diagram of a pipe conduit according to a preferred embodiment of the invention.
Figure 1:
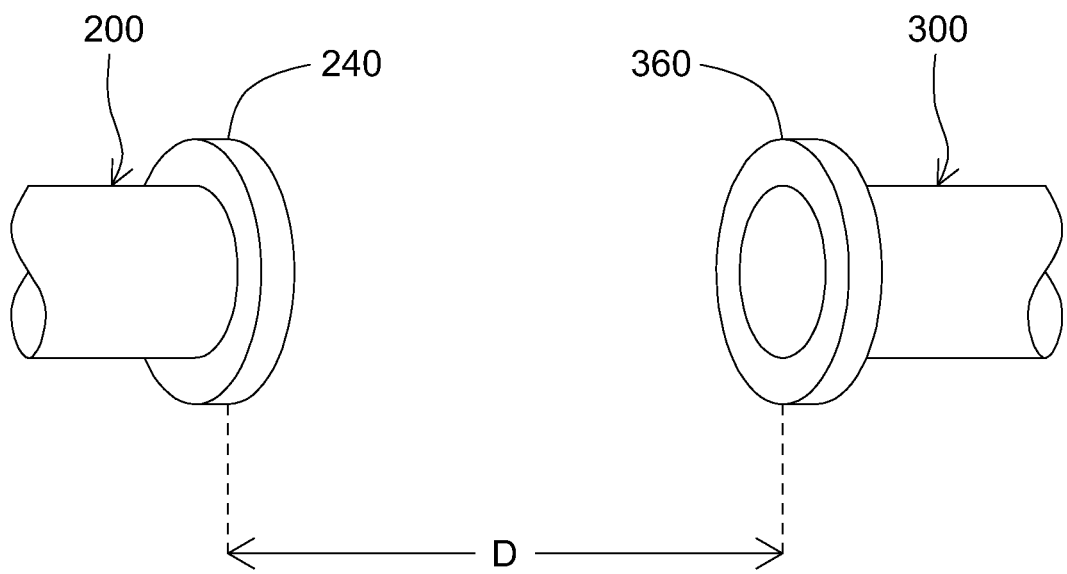
Figure 2:
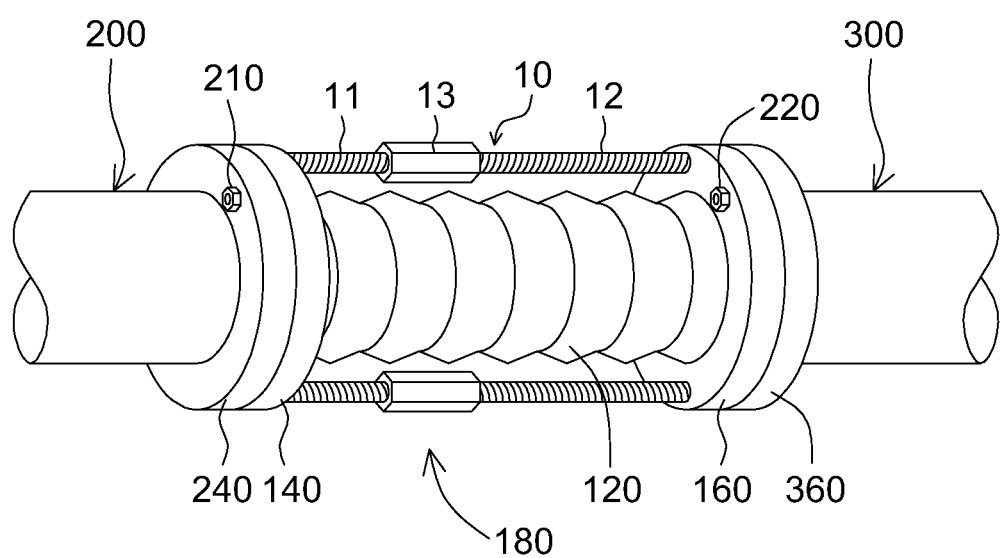
FIG. 2 is an assembly diagram of the pipe conduit according to the preferred embodiment of the invention.

Please refer to FIGS. 1~2 at the same time. FIG. 1 is an exploded diagram of a pipe conduit according to a preferred embodiment of the invention. FIG. 2 is an assembly diagram of the pipe conduit according to the preferred embodiment of the invention. As shown in FIGS. 1~2, the pipe conduit 400 comprises a first pipe unit 100, a second pipe unit 200, and a third pipe unit 300. The second pipe unit 200 and the third pipe unit 300 have a third pipe flange 240 and a fourth pipe flange 360, respectively. The third pipe flange 240 and the fourth pipe flange 360 are separated at a pipe unit assembly distance D. The first pipe unit 100 comprises a pipe body 120, a first pipe flange 140, a second pipe flange 160, and an adjusting structure 180. The pipe body 120 has a first end A and a second end B. The first pipe flange 140 and the second pipe flange 160 are respectively disposed on the first end A and the second end B to be coupled with the third pipe flange 240 of the second pipe unit 200 and the fourth pipe flange 360 of the third pipe unit 300, respectively. The adjusting structure 180, disposed between the first pipe flange 140 and the second pipe flange 160 and parallel to pipe body 120, is used for adjusting the length L of the first pipe unit 100. Therefore, by operating the adjusting structure 180, the length of the first pipe unit 100 is adjusted to facilitate the assembly of the first pipe unit 100, the second pipe unit 200, and the third pipe unit 300. The adjusting structure 180 comprises at least a shaft unit. In order to apply force on the first pipe unit 100 evenly, the adjusting structure 180 may comprise two shaft units separated at 180 degrees or three shaft units mutually separated at 120 degrees. The present embodiment of the invention is exemplified by the case of two shaft units.

In the present embodiment of the invention, the adjusting structure 180 is exemplified by the case of two similar shaft units 10. However, the technology of the present embodiment of the invention is not limited thereto. The two shaft units 10 are separated at 180 degrees. The shaft unit 10 comprises a first shaft 11, a second shaft 12, and an adjusting portion 13. The first pipe flange 140 and the second pipe flange 160 are respectively coupled with the first end A and the second end B of the pipe body 120 via an inner surface. One end of the first shaft 11 and one end of the second shaft 12 are coupled with an inner surface of the first pipe flange 140 and an inner surface of the second pipe flange 160, respectively. The adjusting portion 13 is mounted on the other end of the first shaft 11 and the other end of the second shaft 12. The first shaft 11 and the second shaft 12 are two screw stems with opposite directions of thread. For example, if the first shaft 11 has a right screw thread, then the second shaft 12 has a left screw thread; or, if the first shaft 11 has a left screw thread, then the second shaft 12 has a right screw thread. The adjusting portion 13 is a nut, and when the adjusting portion 13 is rotated, the first shaft 11 and the second shaft 12 are drawn closer or pushed apart. When the operating personnel rotate the adjusting portion 13 along a first direction, the first shaft 11 and the second shaft 12 are drawn closer. That is, the two shaft units 10 apply force on the first pipe flange 140 and the second pipe flange 160 simultaneously for enabling the first pipe flange 140 and the second pipe flange 160 to compress the pipe body 120, so that the length L of the first pipe unit 100 is reduced. When the operating personnel rotate the adjusting portion 13 along a second direction opposite to the first direction, the first shaft 11 and the second shaft 12 are pushed apart. That is, the two shaft units 10 apply force on the first pipe flange 140 and the second pipe flange 160 simultaneously for enabling the first pipe flange 140 and the second pipe flange 160 to extend the pipe body 120, so that the length L of the first pipe unit 100 is increased.

The combination of the screw stem and the nut possesses the characteristics of spiral movement. That is, the relative spiral angle and shift between the screw stem and the nut form a fixed proportion. By rotating the adjusting portion 13 to a fixed number of turns, the first shaft 11 and the second shaft 12 are drawn closer or pushed apart to achieve a corresponding amount of compression or extension, that is, the amount of compression or extension amount corresponding to the first pipe unit 100.

Figure 4:
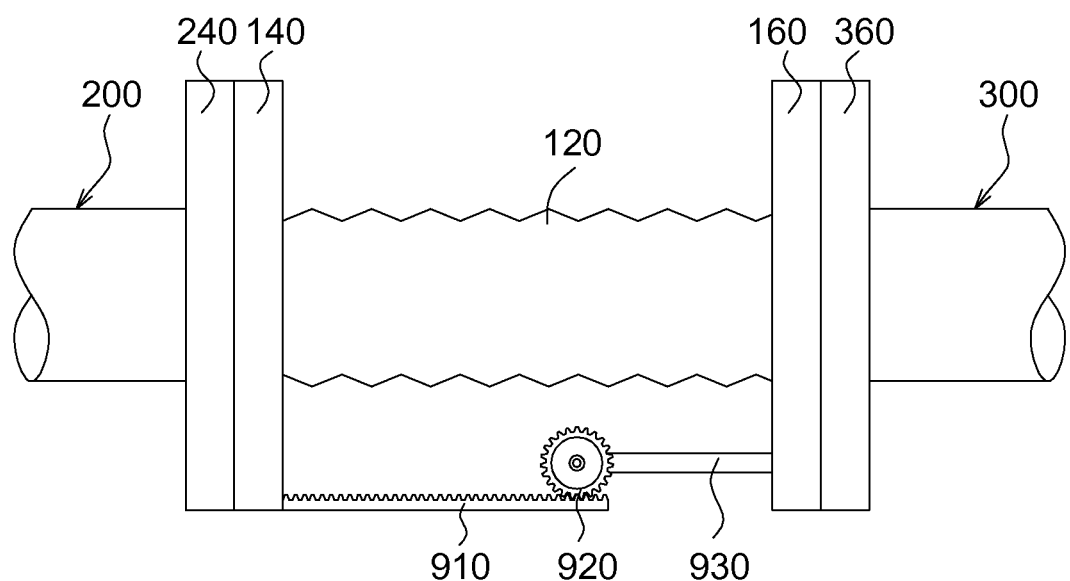
FIG. 4 shows an alternative embodiment.

The shaft unit 10 of the adjusting structure 180 can be formed by two screw stems with opposite directions of rotation and a nut illustrated in FIG. 1, or formed by a rack, a gear and a shaft illustrated in FIG. 4. The rack 910 is engaged with the gear 920, and the gear 920 is coupled with the shaft 930. By rotating the gear, the gear is moved on the rack to adjust the length of the first pipe unit 100. The shaft unit 10 can be formed by a screw stem, a nut, a rotation joint, and a shaft. The nut is coupled with the rotation joint. By rotating the nut, the nut is shifted a distance with respect to the screw stem to adjust the length of the first pipe unit 100.

Figure 3:
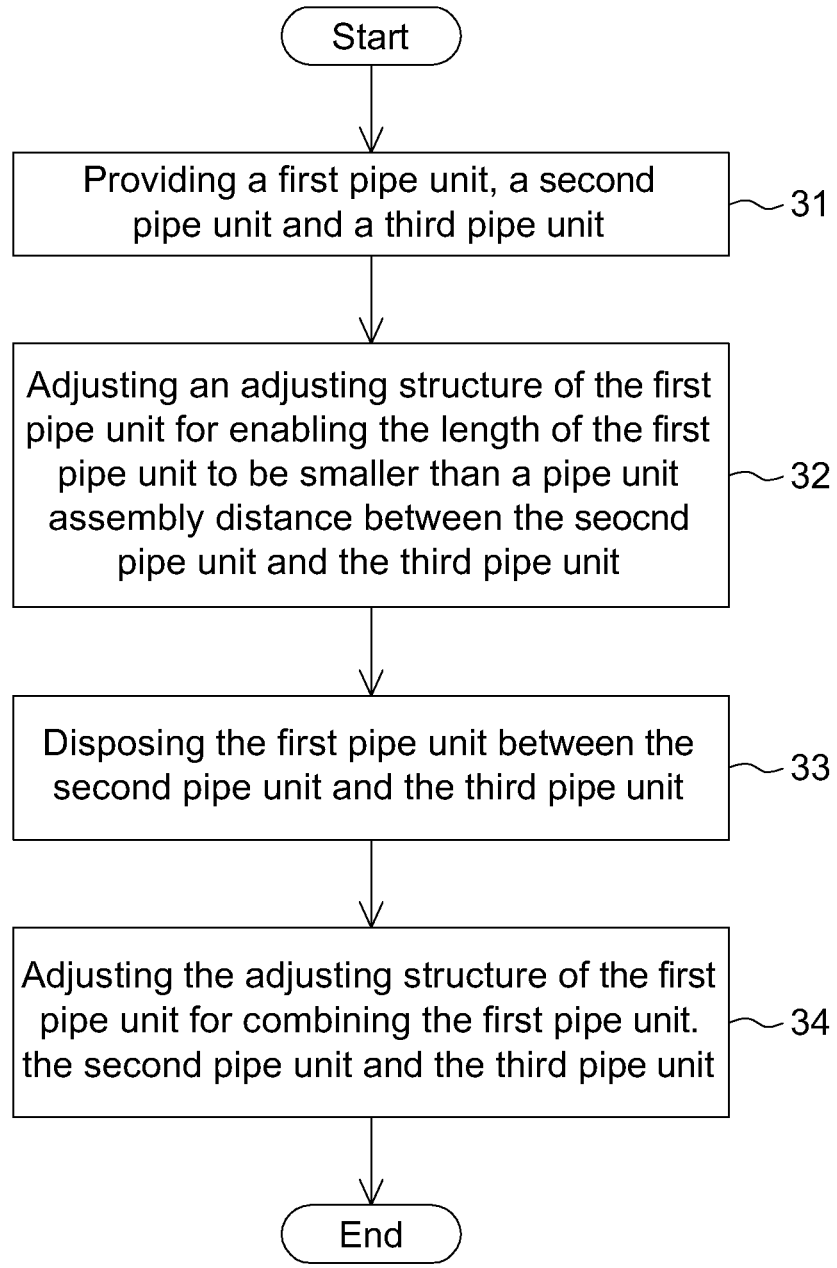
FIG. 3 is a flowchart of a method for assembling the pipe conduit according to the preferred embodiment of the invention.

The process of assembling the pipe conduit 400 according to the present embodiment of the invention is elaborated below with accompanied drawings. Referring to FIG. 3, a flowchart of a method for assembling the pipe conduit according to the preferred embodiment of the invention is shown. Please refer to FIGS. 1~2 at the same time.

Firstly, as shown in step 31, a first pipe unit 100, a second pipe unit 200, and a third pipe unit 300 are provided. The first pipe unit 100 comprises a pipe body 120, a first pipe flange 140, a second pipe flange 160, and an adjusting structure 180. The pipe body 120 has a first end A and a second end B. The first pipe flange 140 and the second pipe flange 160 are disposed on the first end A and the second end B, respectively. The adjusting structure 180 is disposed between the first pipe flange 140 and the second pipe flange 160. The second pipe unit 200 and the third pipe unit 300 have a third pipe flange 240 and a fourth pipe flange 360, respectively. The third pipe flange 240 and the fourth pipe flange 360 are separated at a pipe unit assembly distance D. The length of the first pipe unit 100 equals L.

Next, proceed to step 32, the adjusting structure 180 is adjusted for enabling the length L of the first pipe unit 100 to be smaller than the pipe unit assembly distance D. That is, the first pipe unit 100 is unable to be disposed between the second pipe unit 200 and the third pipe unit unless the length L of the first pipe unit 100 is smaller than the pipe unit assembly distance D. Therefore, by adjusting the adjusting structure 180, that is, by rotating the adjusting portion 13 along a first direction, the operating personnel draw the first shaft 11 and the second shaft 12 closer for enabling the first pipe flange 140 and the second pipe flange 160 to compress the pipe body 120, so that the length L of the first pipe unit 100 is decreased.

Then, proceed to step 33, the first pipe unit 100 is disposed between the second pipe unit 200 and the third pipe unit 300. The first pipe flange 120 and the second pipe flange 140 correspond to the third pipe flange 240 and the fourth pipe flange 360, respectively. When the length L of the first pipe unit 100 is smaller than pipe unit assembly distance D, the operating personnel can dispose the first pipe unit 100 between the second pipe unit 200 and the third pipe unit 300 for enabling the first pipe flange 140 and the second pipe flange 160 to correspond to the third pipe flange 240 and the fourth pipe flange 360, respectively.

Next, as shown in step 34, the adjusting structure 180 is adjusted for enabling the first pipe flange 140 and the second pipe flange 160 to be coupled with the third pipe flange 240 and the fourth pipe flange 360, respectively. When the first pipe unit 100 is disposed between the second pipe unit 200 and the third pipe unit 300, the adjusting portion 13 of the adjusting structure 180 can be adjusted again. That is, the adjusting portion 13 is rotated along a second direction opposite to the first direction to push the first shaft 11 and the second shaft 12 apart, so that the first pipe flange 140 and the second pipe flange 160 are coupled with the third pipe flange 240 and the fourth pipe flange 360, respectively. As shown in FIG. 2, the assembly of the pipe unit 400 is completed.

For the first pipe unit 100 to be fixed on the second pipe unit 200 and the third pipe unit 300, the assembling process of the method of the invention can further comprise a number of sub-steps. For example, the first pipe flange 140 is engaged with the third pipe flange 240, and the second pipe flange 160 is engaged with the fourth pipe flange 360. As shown in FIG. 2, a first engaging element 210 is used to fix the first pipe flange 140 and the third pipe flange 240. A second engaging element 220 is used to fix the second pipe flange 160 and the fourth pipe flange 360. The first engaging element 210 and the second locking element 220 can be a combination of a number of bolts and a number of nuts.

When the pipe conduit 400 is used to transport materials, the joint between the first pipe unit 100, the second pipe unit 200, and the third pipe unit 300 must be leakproof. The assembling process of the method of the invention can further comprise a number of sub-steps. For example, a first leakproof element is disposed between the first pipe flange 140 and the third pipe flange 240; or, a second leakproof element is disposed between the second pipe flange 160 and the fourth pipe flange 360.

The material of the first leakproof element and the second leakproof element includes rubber O-shaped rings. The material of the pipe body 120 of the first pipe unit 100 depends on what material is transported through the pipe conduit. To satisfy the terms for compressibility, the pipe body 120 is preferably a bellow. To satisfy the terms for compressibility under high temperature and high pressure working environment, the pipe body 120 can be a stainless steel bellow.

A pipe unit and method for assembling a pipe conduit using the same are disclosed in the above embodiment of the invention. By using an adjusting structure to adjust the length of the pipe unit to replace the conventional method of compressing the pipe unit directly and manually, the compression amount of the pipe unit is controlled to be smaller than the assembly distance of the pipe unit before the pipe unit is precisely positioned. Consequently, the assembly of the pipe unit is simplified, the positioning of the pipe unit is made easy, and other elements of the pipe conduit are less likely to be damaged.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pipe unit, comprising: a pipe body having a first end and a second end; a first pipe flange disposed on the first end; a second pipe flange disposed on the second end, wherein the pipe body is disposed between the first pipe flange and the second pipe flange; and an adjusting structure disposed between the first pipe flange and the second pipe flange, wherein the adjusting structure is for adjusting the distance between the first end and the second end of the pipe body and includes a rack, a gear and a shaft, the rack extends from a first end connected to the first pipe flange to a second end between the first pipe flange and the second pipe flange, the shaft extends from a first end connected to the second pipe flange to a second end that is connected to the gear between the first pipe flange and the second pipe flange, the rack is engaged with the gear, and the gear is coupled with the shaft, such that the pipe body is lengthened and shortened by moving the shaft or gear on the rack.

2. The pipe unit according to claim 1, wherein the pipe body is a bellows.

3. The pipe unit according to claim 1, wherein the material of the pipe body includes stainless steel.

\* \* \* \* \*